United States Patent
Kuo et al.

(10) Patent No.: US 12,444,812 B2
(45) Date of Patent: Oct. 14, 2025

(54) METHOD FOR MANUFACTURING BATTERY MODULE

(71) Applicant: CYMMETRIK ENTERPRISE CO., LTD., Taipei (TW)

(72) Inventors: Shan-Jen Kuo, Taipei (TW); Bo-Cong Gong, Taipei (TW); Jen-Chieh Wei, Taipei (TW)

(73) Assignee: CYMMETRIK ENTERPRISE CO., LTD., Taipei (TW)

( * ) Notice: Subject to any disclaimer, the term of this patent is extended or adjusted under 35 U.S.C. 154(b) by 434 days.

(21) Appl. No.: 18/086,047

(22) Filed: Dec. 21, 2022

(65) Prior Publication Data
US 2023/0198104 A1   Jun. 22, 2023

(30) Foreign Application Priority Data
Dec. 22, 2021   (TW) .................... 110148216

(51) Int. Cl.
*H01M 50/516*   (2021.01)
*B23K 26/22*   (2006.01)
*H01M 50/586*   (2021.01)

(52) U.S. Cl.
CPC .......... *H01M 50/516* (2021.01); *B23K 26/22* (2013.01); *H01M 50/586* (2021.01)

(58) Field of Classification Search
CPC .................................................. H01M 50/516
See application file for complete search history.

(56) References Cited

U.S. PATENT DOCUMENTS

| 2016/0118633 A1* | 4/2016 | Hongo | H01M 50/507 |
| | | | 429/121 |
| 2016/0181579 A1* | 6/2016 | Geshi | H01M 50/581 |
| | | | 429/61 |
| 2016/0260956 A1* | 9/2016 | Jang | H01M 50/184 |

* cited by examiner

*Primary Examiner* — Brian R Ohara
(74) *Attorney, Agent, or Firm* — Maschoff Brennan

(57) ABSTRACT

This disclosure relates to a method for manufacturing a battery module that includes the following steps: providing a plurality of battery units; providing a collector plate and an insulation layer disposed on the collect plate; contacting the insulation layer to a plurality of terminals of the plurality of battery units; and performing laser welding on a portion of the insulation layer that is in contact with the plurality of terminals to make the collector plate electrically connect the plurality of terminals.

10 Claims, 6 Drawing Sheets

METHOD FOR MANUFACTURING BATTERY MODULE

CROSS-REFERENCE TO RELATED APPLICATIONS

This non-provisional application claims priority under 35 U.S.C. § 119(a) on Patent Application No(s). 110148216 filed in Taiwan, R.O.C. on Dec. 22, 2021, the entire contents of which are hereby incorporated by reference.

TECHNICAL FIELD

The present disclosure relates to a method for manufacturing a battery module, more particularly to a method for manufacturing a battery module that has an insulation layer on its collector plate.

BACKGROUND

In a battery module, a busbar is used to be welded to a plurality of positive terminals of a plurality of battery units so as to provide a positive potential output. However, heat may be generated at the welded portions during the discharge process of the battery units and therefore may melt the insulating wrappings of the battery units near the positive terminals. This may lead unwanted electrical conduction between the positive terminal and the nearby battery casing that can be used as a negative terminal of the batter unit, thereby accidently shorting the battery unit.

To prevent this, before welding the busbar to the positive terminals, a general manufacturing process is performed to adhere an insulator such as a mica sheet or a piece of insulating paper around the positive terminal of each battery unit. However, the insulator needs to be carefully adhered so as to expose the top portion of every positive terminal to facilitate the subsequent welding process, which is not efficient for mass and rapid production.

SUMMARY

The present disclosure provides a method which simplifies the manufacturing process of a batter module.

According to one aspect of the present disclosure, a method for manufacturing a battery module includes the following steps: providing a plurality of battery units; providing a collector plate and an insulation layer disposed on the collect plate; contacting the insulation layer to a plurality of terminals of the plurality of battery units; and performing laser welding on a portion of the insulation layer that is in contact with the plurality of terminals to make the collector plate electrically connect the plurality of terminals.

According to another aspect of the present disclosure, a method for manufacturing a battery module includes the following steps: providing a plurality of battery units; contacting a collector plate to a plurality of terminals of the plurality of battery units; welding the collector plate and the plurality of terminals to electrically connect the collector plate to the plurality of terminals; and plating an insulation layer on the collector plate after the collector plate is electrically connected to the plurality of terminals.

According to the method for manufacturing a battery module discussed above, an insulation layer which covers all of the positive terminals of the battery units is provided between the positive terminals and the collector plate prior to the welding between the collector plate and the positive terminals, or an insulation layer and an insulation structure are provided on the collector plate and the positive terminals after the collector plate is welded to the positive terminals, thus there is no need to additionally add insulators respectively for the positive terminals, thereby achieving a simple manufacturing process for battery module. As such, the method of the aforementioned embodiment is simpler compared to the troublesome steps in conventional manufacturing processes.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Please refer to FIG. 1 to FIG. 5, which are schematic views showing a method for manufacturing a battery module 10 according to an embodiment of the present disclosure.

Figure 1:
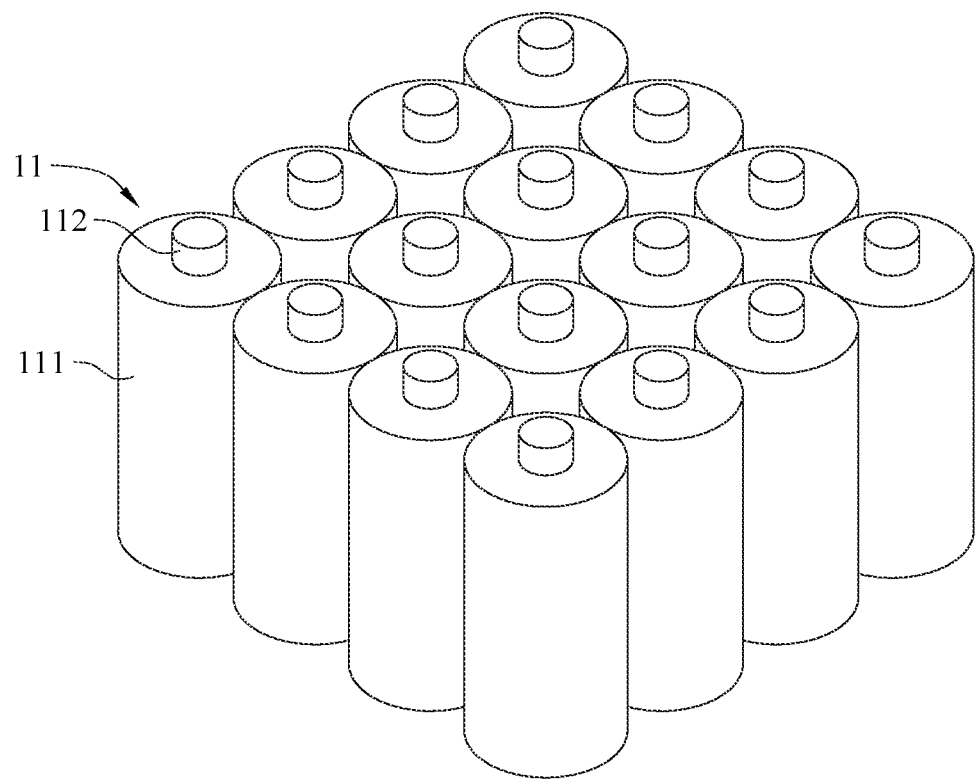
FIG. 1 to FIG. 5 are schematic views showing a method for manufacturing a battery module according to an embodiment of the present disclosure.

Firstly, a plurality of battery units 11 are provided as shown in FIG. 1. The battery units 11 may be arranged in a one-layer array of N×M, where N and M are positive integers. For example, in FIG. 1, the battery units 11 may be arranged in a one-layer array of 4×4. Note that the array of the battery units 11 is exemplary but not intended to limit the disclosure. Each battery unit 11 has a main body 111 and a positive terminal 112 disposed at a side of the main body 111 along the longitudinal axis of the main body 111. The main body 111 has any suitable shape and size. For example, in FIG. 1, the main body 111 is cylindrical. In some other embodiments, the main body of the battery unit may have a cuboidal shape. Further, as shown in FIG. 1, the battery units 11 are in an arrangement that the main bodies 111 are aligned with each other and the positive terminals 112 are located at the same side of the array so that the positive terminals 112 of the battery units 11 protrude toward the same direction.

Figure 2:
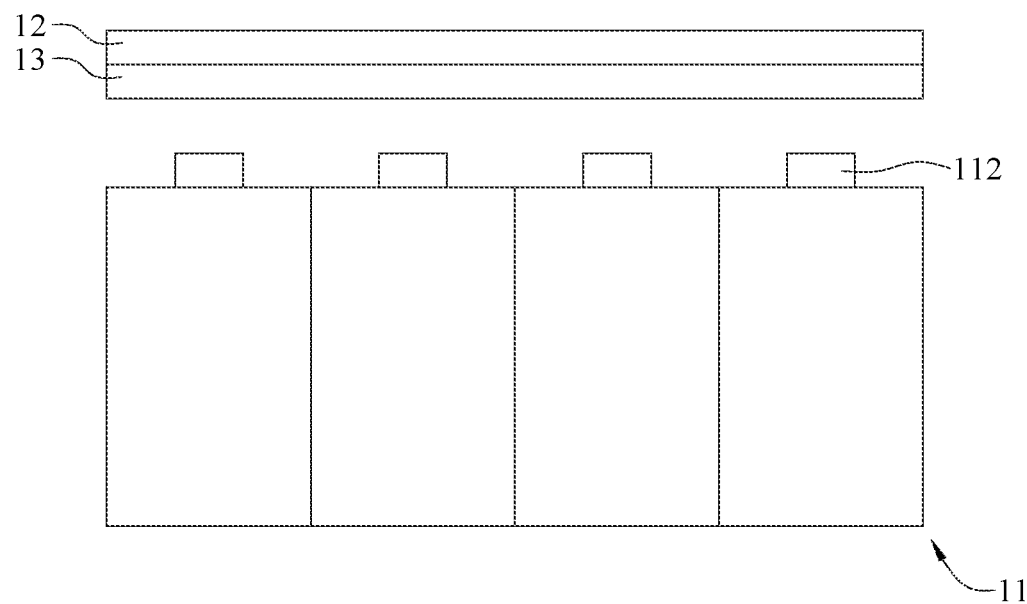

Then, as shown in FIG. 2, a first collector plate 12 and a first insulation layer 13 are provided. The first insulation layer 13 is disposed on the first collector plate 12 by, for example, any suitable plating process prior to the placement of the first collector plate 12 and the first insulation layer 13 onto the battery units 11. In FIG. 2, the whole of the first insulation layer 13 is electrically insulating.

Figure 3:
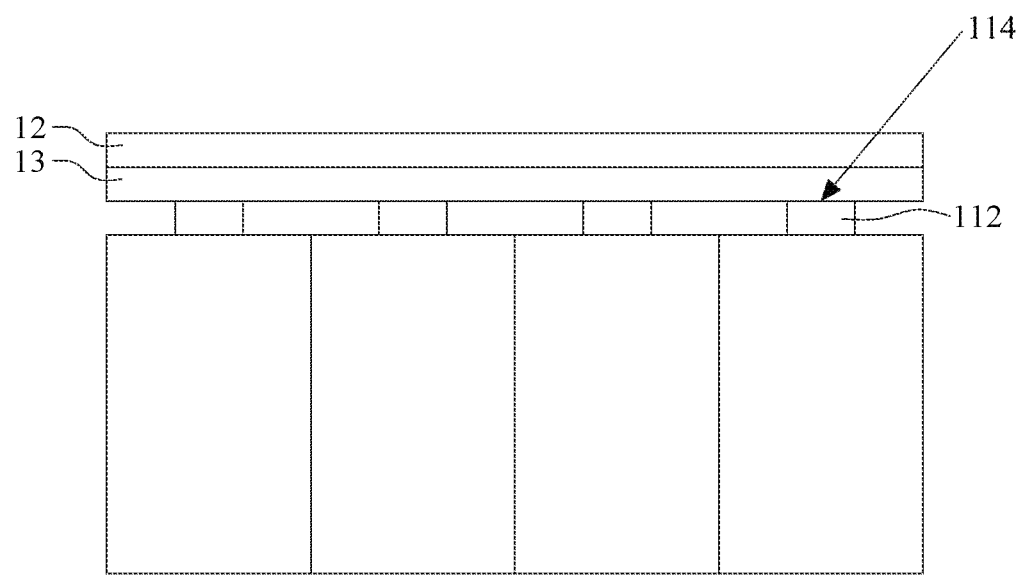

Then, as shown in FIG. 3, the first insulation layer 13 is in direct contact with all the positive terminals 112 of the battery units 11.

Then, the portion of the first insulation layer 13 that is in direct contact with the positive terminals 112 of the battery units 11 is welded to the positive terminals 112. For example, laser welding is performed on the portion of the first insulation layer 13 that is in direct contact with the positive terminals 112 of the battery units 11 (e.g., the portion as indicated by the arrow 114 in FIG. 3).

Figure 4:
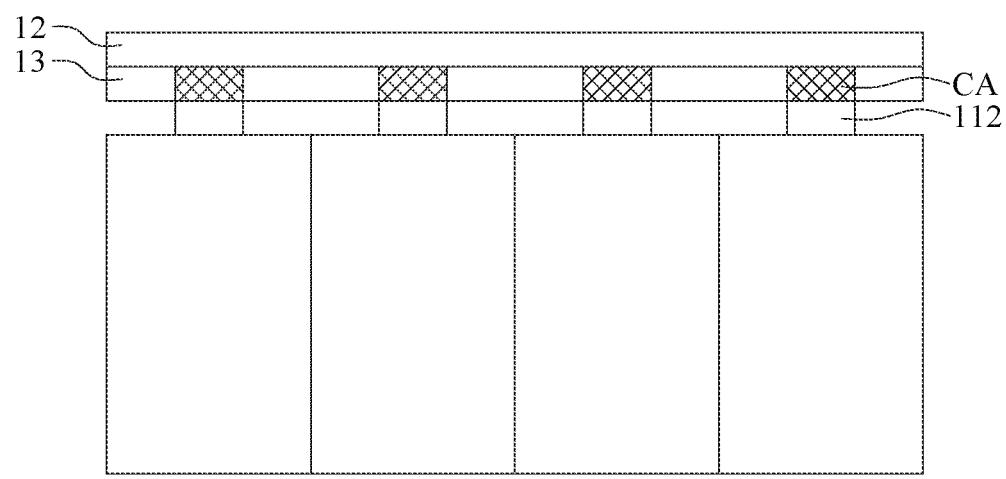

By doing so, as shown in FIG. 4, molecular diffusion occurs in the portion of the first insulation layer 13 in which the laser is focus on, such that the molecules focused by the laser will diffuse toward the first collector plate 12 and the positive terminals 112, thereby converting the portions of the first insulation layer 13 that are located between the positive terminals 112 and the first collector plate 12 into connection areas CA being electrical conductivity. As such, the first collector plate 12 is able to electrically connect the positive terminals 112 via the connection areas CA. Note that the laser welding may be performed under: about 250-350 watts (W) in power, 600-800 millimeters per second (mm/s) in speed, 10-20 megahertz (MHz) in frequency, and 40-60% in overlapping rate.

Figure 5:
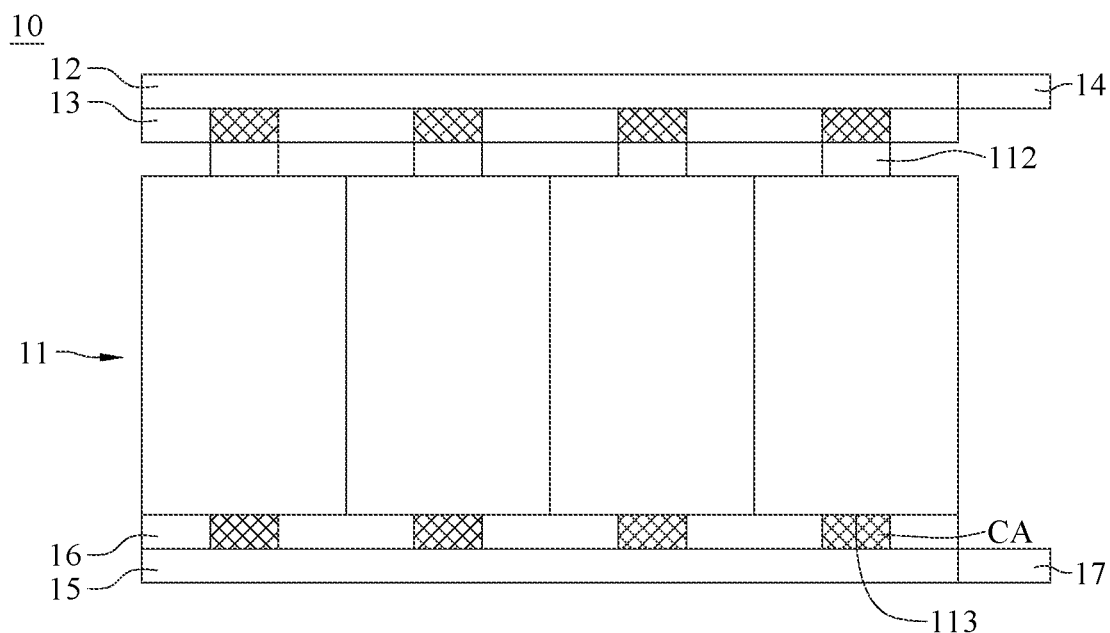

Then, as shown in FIG. 5, a first tab 14 is provided on the first collector plate 12. Specifically, the first tab 14 is electrically conductive and may be fixed to a side of the first collector plate 12 by, for example, any suitable welding process. As shown, the first tab 14 laterally protrudes outwards from an edge of the first collector plate 12 and is electrically connected to the first collector plate 12. The first tab 14 is configured to be served as a positive potential connector of the battery module 10.

Then, a second collector plate 15 and a second insulation layer 16 are provided. The second insulation layer 16 is disposed on the second collector plate 15 by, for example, any suitable plating process prior to the placement of the second collector plate 15 and the second insulation layer 16 onto the battery units 11. In FIG. 5, the whole of the second insulation layer 16 is electrically insulating.

Then, the second insulation layer 16 is in direct contact with all the negative terminals 113 of the battery units 11 that are located opposite to the positive terminals 112.

Then, the portion of the second insulation layer 16 that is in direct contact with the negative terminals 113 of the battery units 11 is welded to the negative terminals 113. For example, laser welding is performed on the portion of the second insulation layer 16 that is in direct contact with the negative terminals 113 of the battery units 11 so that molecular diffusion occurs in the portion of the second insulation layer 16 in which the laser is focus on, thereby converting the portions of the second insulation layer 16 that are located between the negative terminals 113 and the second collector plate 15 into connection areas CA being electrical conductivity. As such, the second collector plate 15 is able to electrically connect the negative terminals 113 via the connection areas CA.

Then, as shown in FIG. 5, a second tab 17 is provided on the second collector plate 15. Specifically, the second tab 17 is electrically conductive and may be fixed to a side of the second collector plate 15 by, for example, any suitable welding process. As shown, the second tab 17 laterally protrudes outwards from an edge of the second collector plate 15 and is electrically connected to the second collector plate 15. The second tab 17 is configured to be serves as a negative potential connector of the battery module 10. The battery module 10, as shown in FIG. 5, may be accommodated in a casing (not shown).

In some other embodiments, the first tab and the second tab may be integrally formed on the first collector plate and the second collector plate, respectively; in such a case, there is no need to additionally weld the first tab and second tab.

According to the method for manufacturing a battery module discussed above, an insulation layer (i.e., the first insulation layer 13) which covers all of the positive terminals of the battery units is provided between the positive terminals and the collector plate (i.e., the first collector plate 12) prior to the welding between the collector plate and the positive terminals, thus there is no need to additionally add insulators respectively for the positive terminals, thereby achieving a simple manufacturing process for battery module. As such, the method of the aforementioned embodiment is simpler compared to the troublesome steps in conventional manufacturing processes.

Please refer to FIG. 6 to FIG. 9, which are schematic views showing a method for manufacturing a battery module 20 according to another embodiment of the present disclosure. For the purpose of simplicity, only the main differences between the introduced embodiment and the previous embodiments will be described in detail below.

Firstly, a plurality of battery units 21 are provided. The battery units 21 may be arranged in a one-layer array of N×M, where N and M are positive integers. Further, as shown, the battery units 21 are in an arrangement that the positive terminals 212 are located at the same side of the array so that the positive terminals 212 of the battery units 21 protrude toward the same direction.

Figure 6:
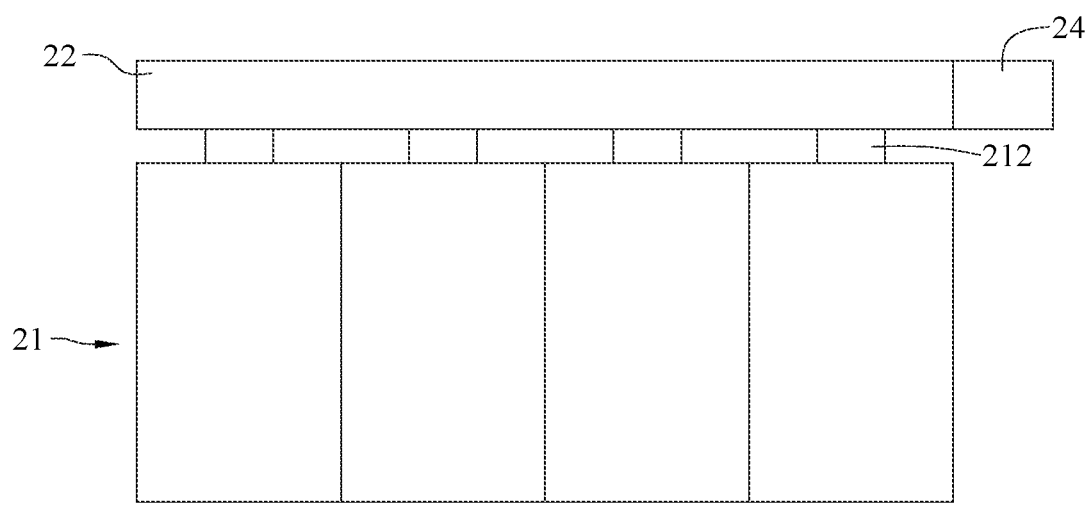
FIG. 6 to FIG. 9 are schematic views showing a method for manufacturing a battery module according to another embodiment of the present disclosure.

Then, a first collector plate 22 is provided. As shown in FIG. 6, the first collector plate 22 is in direct contact with all the positive terminals 212 of the battery units 21.

Then, the first collector plate 22 and the positive terminals 212 are fixed to each other by, for example, any suitable welding process. For example, the first collector plate 22 is fixed to the positive terminals 212 by spot welding or laser welding. By doing so, the first collector plate 22 is electrically connected to the positive terminals 212.

Then, as shown in FIG. 6, a first tab 24 is provided on the first collector plate 22. Specifically, the first tab 24 is electrically conductive and may be fixed to a side of the first collector plate 22 by, for example, any suitable welding process. As shown, the first tab 24 laterally protrudes outwards from an edge of the first collector plate 22 and is electrically connected to the first collector plate 22. The first tab 24 is configured to be serves as a positive potential connector of the battery module 20.

Figure 7:
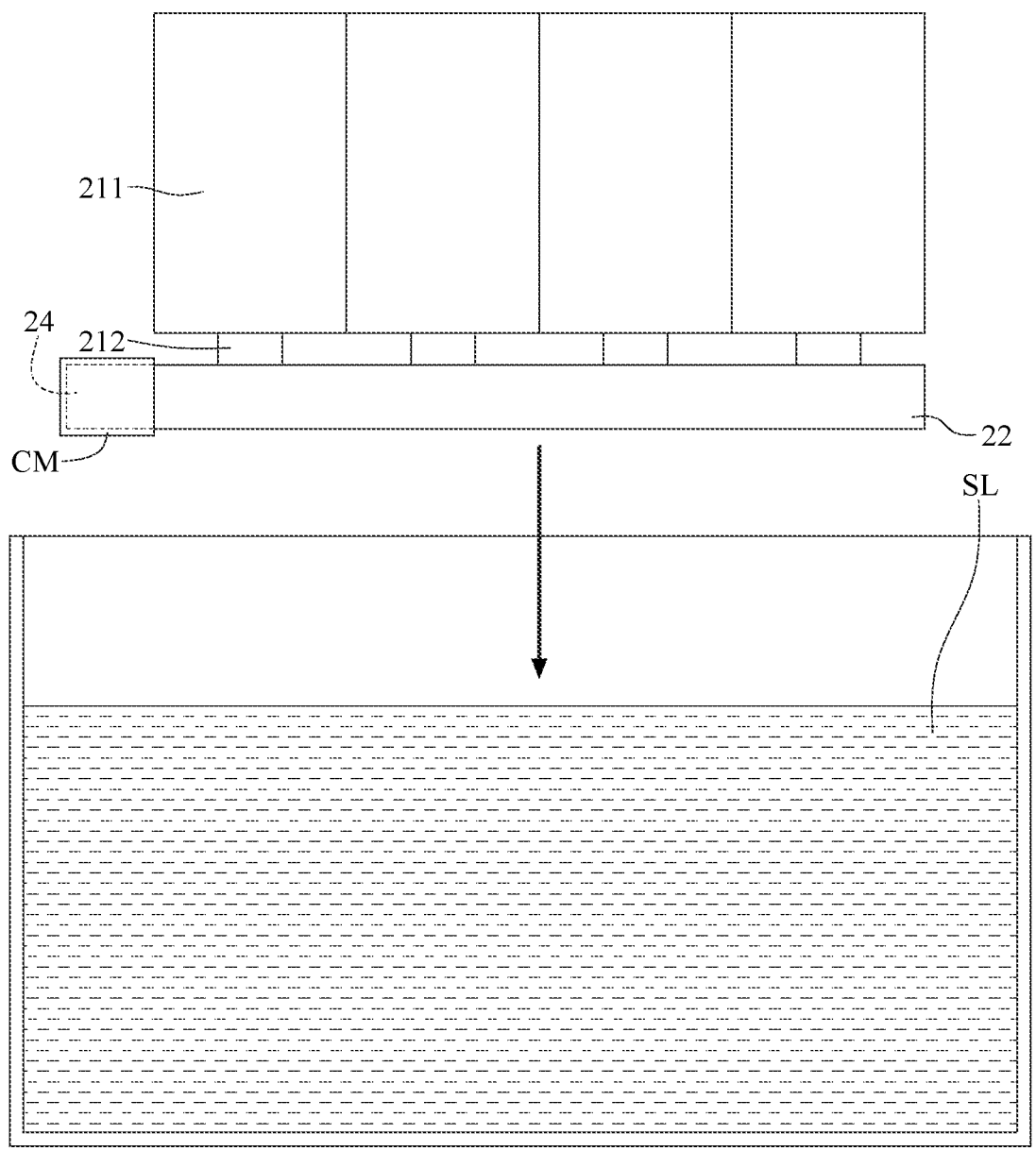

Then, as shown in FIG. 7, a first covering member CM is provided to cover the first tab 24 which is disposed on and electrically connected to the first collector plate 22.

Figure 8:
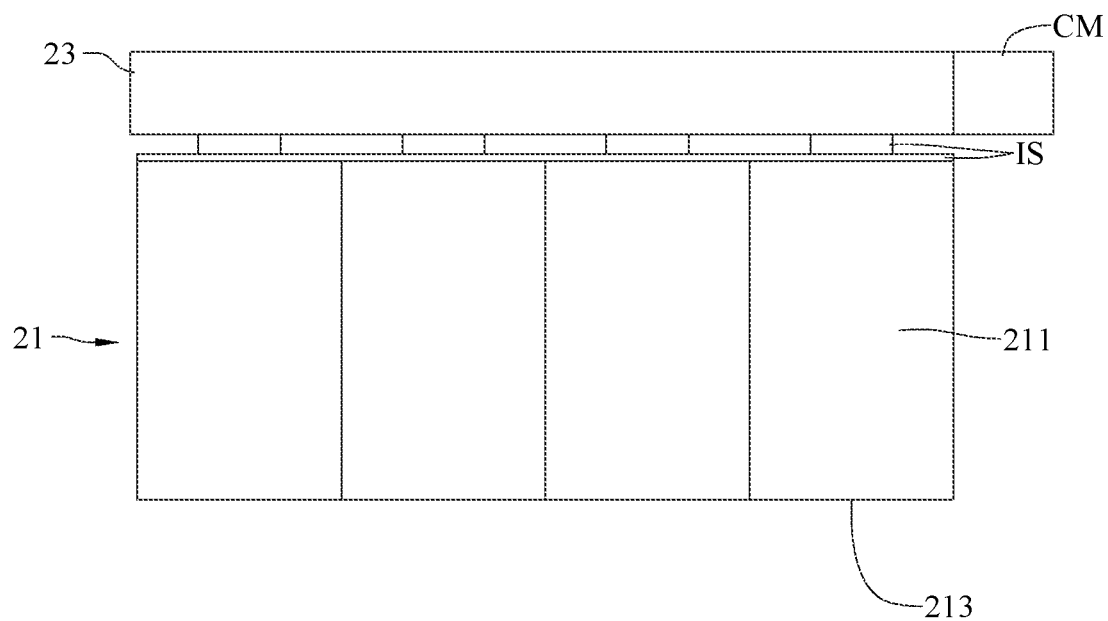

Then, an anodizing process or an electroless plating process is performed. For example, as shown in FIGS. 7 and 8, during the anodizing process, the first collector plate 22 is immersed in a plating solution SL so that a first insulation layer 23 is formed on the exposed surface of the first collector plate 22. Since the positive terminals 212 is welded to the first collector plate 22 to partially cover the first collector plate 22 before the first collector plate 22 is immersed in the plating solution SL, the first insulation layer 23 does not exist on the area of the first collector plate 22 that directly contacts the positive terminals 212. Thus, the first collector plate 22 is able to electrically connect the positive terminals 212 via the portion thereof that directly contacts the positive terminals 212. Optionally, when the positive terminals 212 is also immersed in the plating solution SL during the anodizing process, an insulation structure IS being made of the same material as that of the first insulation layer 23 is formed on the positive terminals 212 and on sides of main bodies 211 in which the positive terminals 212 are located. Note the insulation material that covers the first collector plate and the positive terminal may be provided using other suitable processes, such as physical vapor deposition, chemical vapor deposition or coating. It is also noted that the insulation material may only be provided on the side of the first collector plate that faces toward the positive terminals.

Figure 9:
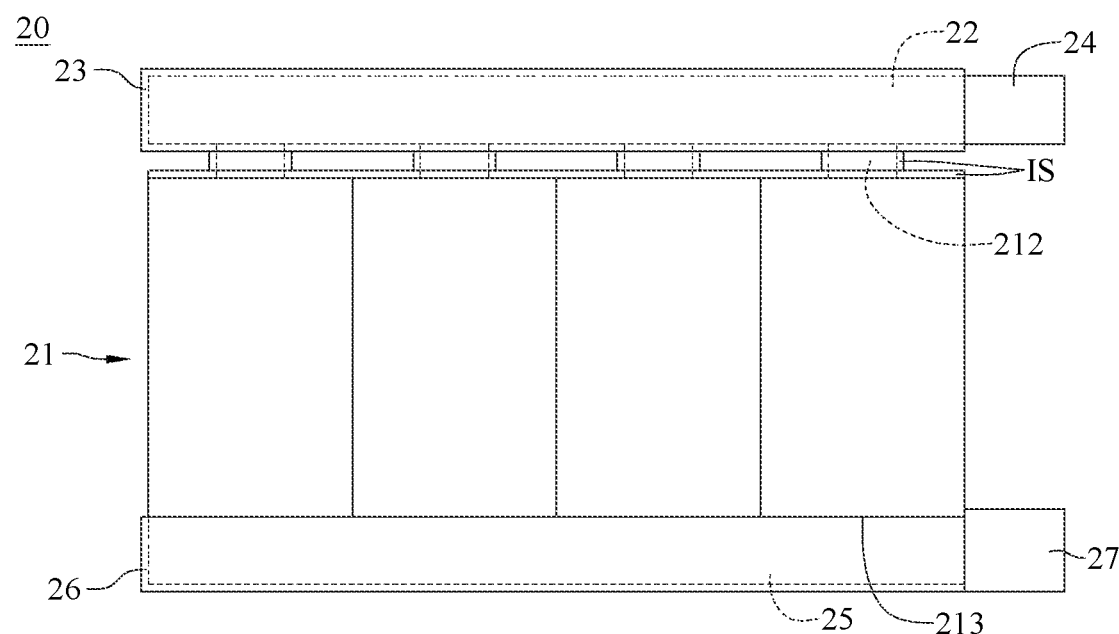

Then, as shown in FIG. 9, the second collector plate 25 and the negative terminals 213 are fixed to each other by, for example, any suitable welding process. For example, the second collector plate 25 is fixed to the negative terminals 213 by spot welding or laser welding. By doing so, the second collector plate 25 is electrically connected t to the negative terminals 213.

Then, as shown in FIG. 9, a second tab 27 is provided on the second collector plate 25. Specifically, the second tab 27 is electrically conductive and may be fixed to a side of the second collector plate 25 by, for example, any suitable welding process. As shown, the second tab 27 laterally protrudes outwards from an edge of the second collector plate 25 and is electrically connected to the second collector plate 25. The second tab 27 is configured to be serves as a negative potential connector of the battery module 20.

Then, a second covering member (not shown) is provided to cover the second tab 27 which is disposed on and electrically connected to the second collector plate 25.

Then, an anodizing process or an electroless plating process is performed so that a second insulation layer 26 is formed on the exposed surface of the second collector plate 25. Then, the first covering member CM and the second covering member are removed to complete the manufacture of the battery module 20. The battery module 20, as shown in FIG. 9, may be accommodated in a casing (not shown). Note the insulation material that covers the second collector plate may be provided using other suitable processes, such as physical vapor deposition, chemical vapor deposition or coating.

In some other embodiments, the first tab and the second tab may be integrally formed on the first collector plate and the second collector plate, respectively; in such a case, there is no need to additionally weld the first tab and the second tab.

In some other embodiments, the welding process for providing the first tab to the first collector plate may be performed after the plating process for providing the first insulation layer on the first collector plate; in such a case, there is no need to additionally provide the first covering member.

In some other embodiments, the welding process for providing the second tab to the second collector plate may be performed after the plating process for providing the second insulation layer on the second collector plate; in such a case, there is no need to additionally provide the second covering member.

According to the method for manufacturing battery module discussed above, the first insulation layer and the insulation structure are provided on the first collector plate and the positive terminals after the first collector plate is welded to the positive terminals, thus there is no need to additionally add insulators respectively for the positive terminals, thereby achieving a simple manufacturing process for battery module. As such, the method of the aforementioned embodiment is simpler compared to the troublesome steps in conventional manufacturing processes.

Please be noted that the battery units may be connected in parallel or in series according to actual requirements. In the case of the battery units are connected in series, the battery units are divided into a first group and a second group. Then, each of the first group and the second group of the battery units is arranged in a one-layer array. Then, positive terminals of the second group are in direct contact with negative terminals of the first group to form series connection and to expose the positive terminals of the first group.

Figure 10:
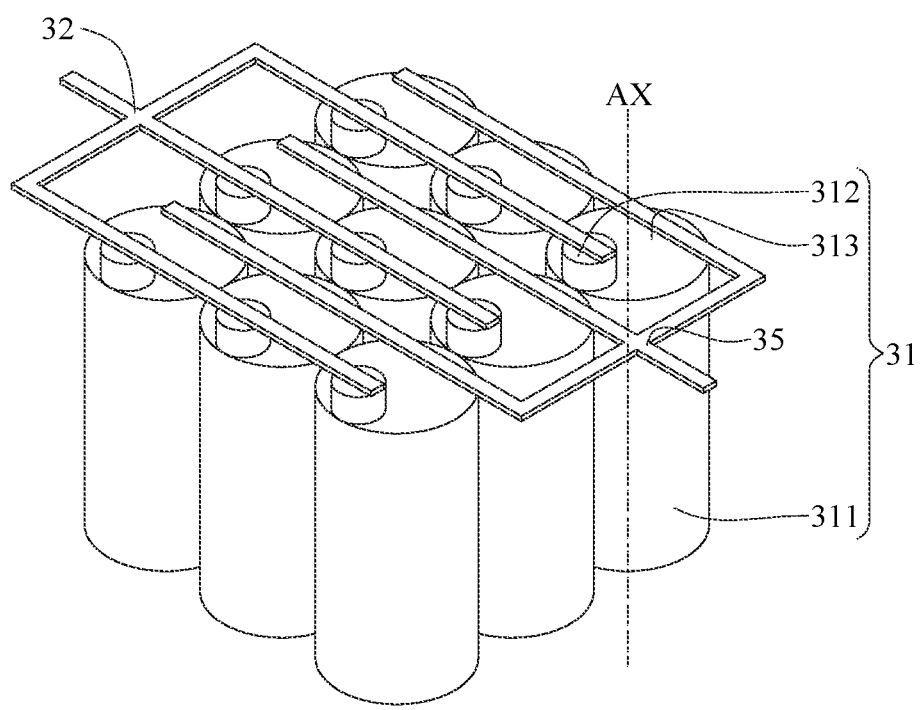
FIG. 10 is a schematic view showing an arrangement of battery units and collector plates of a battery module according to further another embodiment of the present disclosure.

Please refer to FIG. 10, which is a schematic view showing an arrangement of battery units 31 and collector plates 32 and 35 of a battery module according to further another embodiment of the present disclosure. For the purpose of simplicity, only the main differences between the introduced embodiment and the previous embodiments will be described in detail below.

In the above embodiments, the positive terminal is disposed along the longitudinal axis of the main body of the battery unit, and the negative terminal is located opposite to the positive terminal. In this embodiment, the positive terminal 312 is disposed offset from a central axis AX of the main body 311, and the area of the main body 311 that is absent of the positive terminal 312 is employed as a negative terminal of the battery unit 31 (e.g., the area indicated by 313). The first collector plate 32 and the second collector plate 35 may each have fingers so that the first collector plate 32 and the second collector plate 35 are able to interlace with each other and respectively electrically connect the positive terminals 312 and the negative terminals 313.

According to the method for manufacturing a battery module discussed above, an insulation layer which covers all of the positive terminals of the battery units is provided between the positive terminals and the collector plate prior to the welding between the collector plate and the positive terminals, or an insulation layer and an insulation structure are provided on the collector plate and the positive terminals after the collector plate is welded to the positive terminals, thus there is no need to additionally add insulators respectively for the positive terminals, thereby achieving a simple manufacturing process for battery module. As such, the method of the aforementioned embodiment is simpler compared to the troublesome steps in conventional manufacturing processes.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A method for manufacturing a battery module, comprising:
   providing a plurality of battery units;
   providing a collector plate and an insulation layer disposed on the collect plate;
   contacting the insulation layer to a plurality of terminals of the plurality of battery units; and
   performing laser welding on a portion of the insulation layer that is in contact with the plurality of terminals to make the collector plate electrically connect the plurality of terminals.

2. The method according to claim 1, wherein providing the plurality of battery units comprises:

arranging the plurality of terminals of the plurality of battery units to a same side of the plurality of battery units.

3. The method according to claim 1, wherein providing the collector plate and the insulation layer comprises:
plating the insulation layer on the collector plate.

4. The method according to claim 1, further comprising:
providing a tab protruding from and electrically connected to the collector plate.

5. The method according to claim 1, wherein a quantity of each of the collector plate and the insulation layer is two, the plurality of terminals comprises a plurality of positive terminals and a plurality of negative terminals, and the two collector plates are respectively electrically connected to the plurality of positive terminals and the plurality of negative terminals via the portions of the two insulation layers where the laser welding is performed.

6. A method for manufacturing a battery module, comprising:
providing a plurality of battery units;
contacting a collector plate to a plurality of terminals of the plurality of battery units;
welding the collector plate and the plurality of terminals to electrically connect the collector plate to the plurality of terminals; and
plating an insulation layer on the collector plate after the collector plate is electrically connected to the plurality of terminals.

7. The method according to claim 6, wherein providing the plurality of battery units comprises:
dividing the plurality of battery units into a first group and a second group;
arranging each of the first group and the second group of the plurality of battery units in a one-layer array; and
connecting the first group and the second group of the plurality of battery units in series to expose the plurality of terminals of the first group.

8. The method according to claim 6, wherein before plating the insulation layer on the collector plate, further comprising:
providing a covering member to cover a tab disposed on and electrically connected to the collector plate.

9. The method according to claim 6, wherein the plurality of battery units comprises a plurality of main bodies and the plurality of terminals, the plurality of terminals are a plurality of positive terminals that are disposed offset from a central axis of the plurality of main bodies.

10. The method according to claim 9, wherein the plurality of main bodies are cylindrical or cuboidal.

* * * * *